United States Patent
Isaacs et al.

(10) Patent No.: US 6,636,147 B1
(45) Date of Patent: Oct. 21, 2003

(54) REFERENCE LIGHT FOR MANEUVERING A VEHICLE

(76) Inventors: Isiah Isaacs, 6500 E. 88th Ave., #157, Henderson, CO (US) 80640; Arcenio J. Trujillo, 6500 E. 88th Ave., #157, Henderson, CO (US) 80640; Alberto Trujillo, 6500 E. 88th Ave., #157, Henderson, CO (US) 80640

( * ) Notice: Subject to any disclaimer, the term of this patent is extended or adjusted under 35 U.S.C. 154(b) by 68 days.

(21) Appl. No.: 09/952,864

(22) Filed: Sep. 14, 2001

(51) Int. Cl.⁷ .............................................. G08B 21/00
(52) U.S. Cl. ........................ 340/431; 340/468; 362/485
(58) Field of Search ................................. 340/431, 468, 340/475, 479, 463, 465; 362/485, 509, 516, 517

(56) References Cited

U.S. PATENT DOCUMENTS

| | | | | |
|---|---|---|---|---|
| 3,005,089 A | * | 10/1961 | Robbins | 362/485 X |
| 3,017,500 A | * | 1/1962 | Pezzopane | 362/506 |
| 4,905,126 A | | 2/1990 | Faia | |
| 5,032,955 A | | 7/1991 | Jurgens | |
| 5,299,102 A | * | 3/1994 | Zimmerman, III | 362/485 |
| 5,428,512 A | | 6/1995 | Mouzas | |
| 5,430,625 A | | 7/1995 | Abarr et al. | |
| 5,497,304 A | * | 3/1996 | Caine | 362/485 |
| D372,317 S | | 7/1996 | Kijima | |
| 5,682,138 A | | 10/1997 | Powell et al. | |
| 5,893,638 A | * | 4/1999 | Hufner et al. | 362/506 |
| 6,357,818 B1 | * | 3/2002 | Adams | 296/181 |

* cited by examiner

*Primary Examiner*—Thomas Mullen

(57) ABSTRACT

A reference light for maneuvering a vehicle for providing a point of reference for the rear portion of a vehicle when maneuvering the vehicle. The reference light for maneuvering a vehicle includes a plate having a first surface and a second surface. The plate has a top edge, a bottom edge, a first side edge and a second side edge. A plurality of fasteners is extended through the first and second surfaces for removably attaching the plate to a vehicle such that the first side edge extends toward a front side of the vehicle. A light emitting device is securely attached to the first surface.

9 Claims, 6 Drawing Sheets

REFERENCE LIGHT FOR MANEUVERING A VEHICLE

BACKGROUND OF THE INVENTION

1. Field of the Invention

The present invention relates to elongated vehicle lighting systems and more particularly pertains to a new reference light for maneuvering a vehicle for providing a point of reference for the rear portion of a vehicle when maneuvering the vehicle.

2. Description of the Prior Art

The use of elongated vehicle lighting systems is known in the prior art. More specifically, elongated vehicle lighting systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,905,126; 5,430,625; 5,682,138; 5,428,512; 5,032,955; and U.S. Design Pat. No. 372,317.

While these devices fulfill their respective, particular objectives and requirements, the aforementioned patents do not disclose a new reference light for maneuvering a vehicle. The inventive device includes a plate having a first surface and a second surface. The plate has a top edge, a bottom edge, a first side edge and a second side edge. A plurality of fasteners is extended through the first and second surfaces for removably attaching the plate to a vehicle such that the first side edge extends toward a front side of the vehicle. A light emitting device is securely attached to the first surface.

In these respects, the reference light for maneuvering a vehicle according to the present invention substantially departs from the conventional concepts and designs of the prior art, and in so doing provides an apparatus primarily developed for the purpose of providing a point of reference for the rear portion of a vehicle when maneuvering the vehicle.

SUMMARY OF THE INVENTION

In view of the foregoing disadvantages inherent in the known types of elongated vehicle lighting systems now present in the prior art, the present invention provides a new reference light for maneuvering a vehicle construction wherein the same can be utilized for providing a point of reference for the rear portion of a vehicle when maneuvering the vehicle.

The general purpose of the present invention, which will be described subsequently in greater detail, is to provide a new reference light for maneuvering a vehicle apparatus and method which has many of the advantages of the elongated vehicle lighting systems mentioned heretofore and many novel features that result in a new reference light for maneuvering a vehicle which is not anticipated, rendered obvious, suggested, or even implied by any of the prior art elongated vehicle lighting systems, either alone or in any combination thereof.

To attain this, the present invention generally comprises a plate having a first surface and a second surface. The plate has a top edge, a bottom edge, a first side edge and a second side edge. A plurality of fasteners is extended through the first and second surfaces for removably attaching the plate to a vehicle such that the first side edge extends toward a front side of the vehicle. A light emitting device is securely attached to the first surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new reference light for maneuvering a vehicle apparatus and method which has many of the advantages of the elongated vehicle lighting systems mentioned heretofore and many novel features that result in a new reference light for maneuvering a vehicle which is not anticipated, rendered obvious, suggested, or even implied by any of the prior art elongated vehicle lighting systems, either alone or in any combination thereof.

It is another object of the present invention to provide a new reference light for maneuvering a vehicle which may be easily and efficiently manufactured and marketed.

It is a further object of the present invention to provide a new reference light for maneuvering a vehicle which is of a durable and reliable construction.

An even further object of the present invention is to provide a new reference light for maneuvering a vehicle which is susceptible of a low cost of manufacture with regard to both materials and labor, and which accordingly is then susceptible of low prices of sale to the consuming public, thereby making such reference light for maneuvering a vehicle economically available to the buying public.

Still yet another object of the present invention is to provide a new reference light for maneuvering a vehicle which provides in the apparatuses and methods of the prior art some of the advantages thereof, while simultaneously overcoming some of the disadvantages normally associated therewith.

Still another object of the present invention is to provide a new reference light for maneuvering a vehicle for providing a point of reference for the rear portion of a vehicle when maneuvering the vehicle.

Yet another object of the present invention is to provide a new reference light for maneuvering a vehicle which includes a plate having a first surface and a second surface. The plate has a top edge, a bottom edge, a first side edge and a second side edge. A plurality of fasteners is extended through the first and second surfaces for removably attaching the plate to a vehicle such that the first side edge extends toward a front side of the vehicle. A light emitting device is securely attached to the first surface.

Still yet another object of the present invention is to provide a new reference light for maneuvering a vehicle that is retrofittable to existing recreational vehicles, semi-trailers or other elongated vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
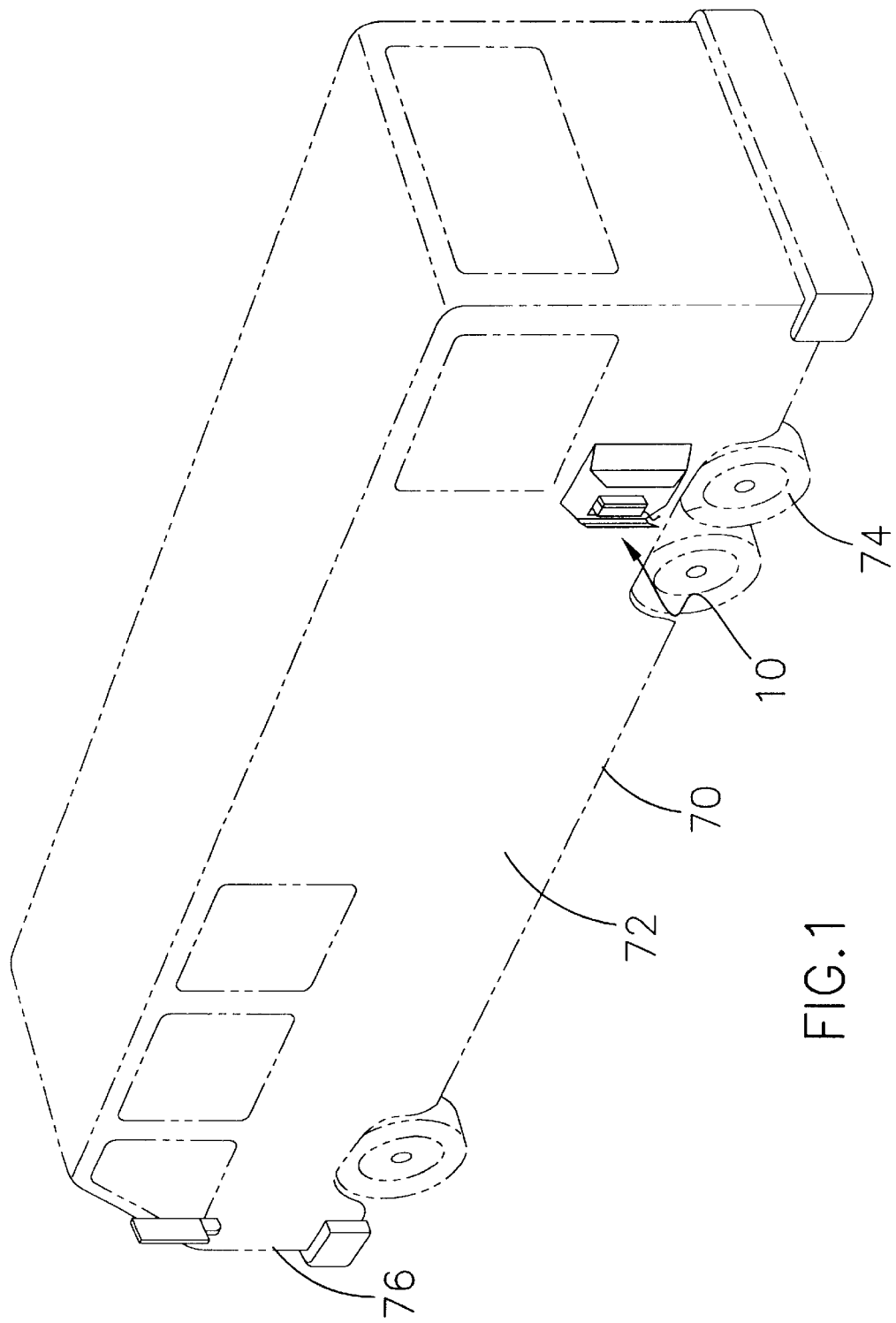
FIG. 1 is a schematic in-use view of a new reference light for maneuvering a vehicle according to the present invention.
Figure 2:
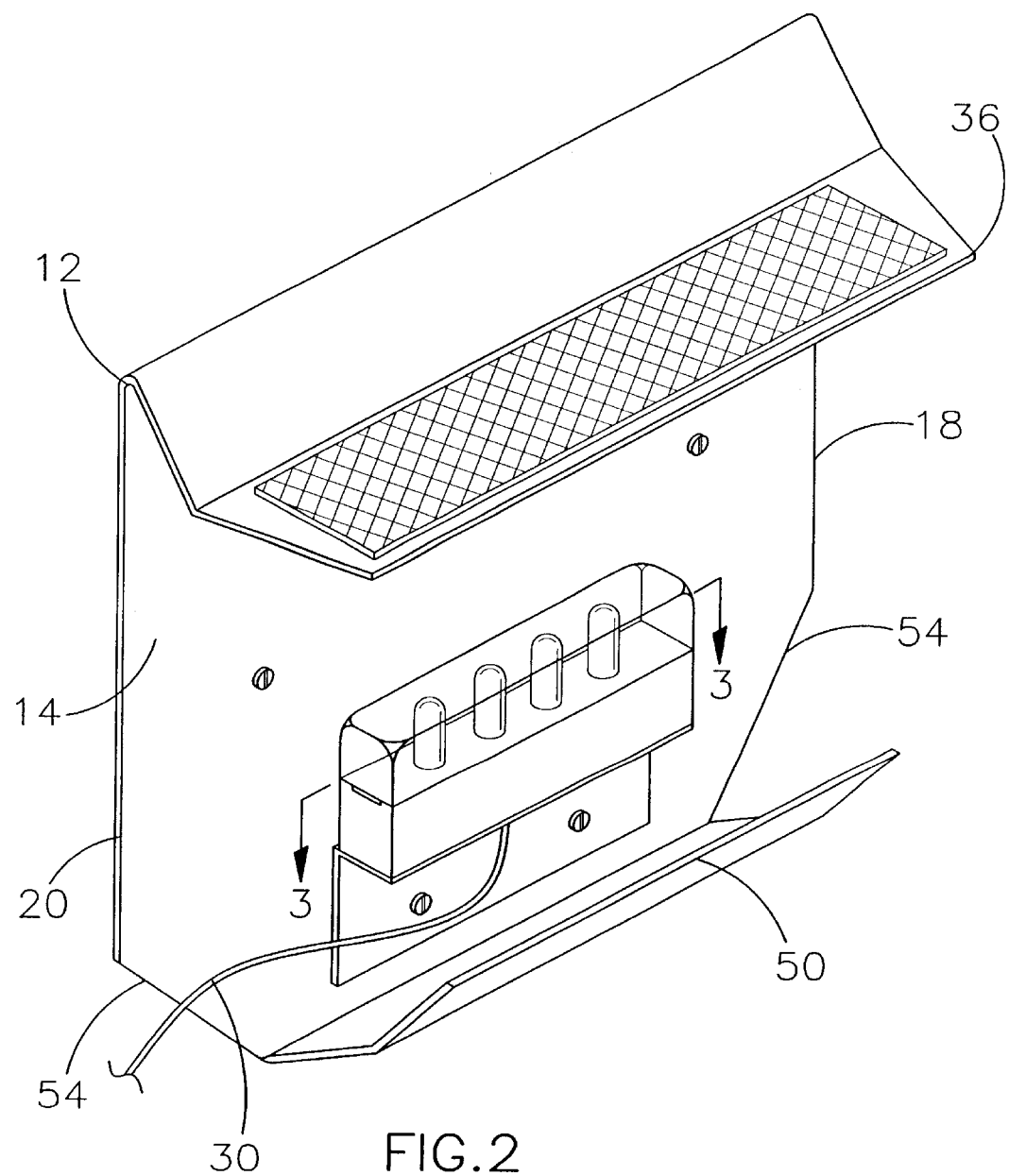
FIG. 2 is a schematic perspective view of the present invention.
Figure 3:
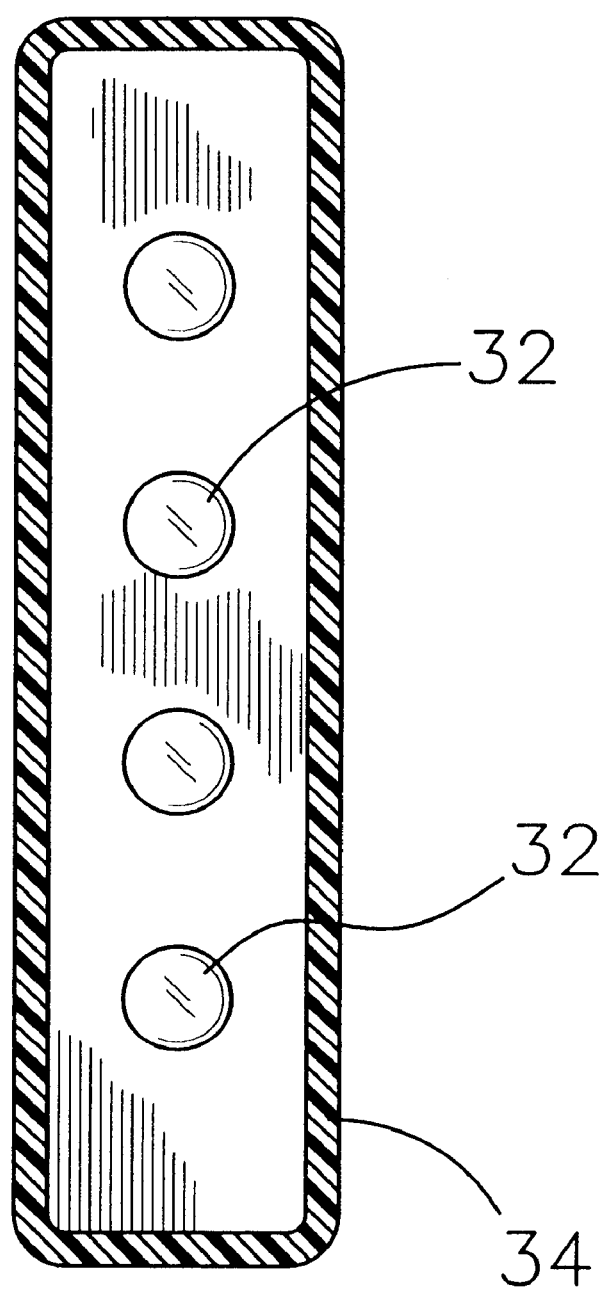
FIG. 3 is a schematic cross-sectional view taken along line 3—3 of FIG. 2 of the present invention.
Figure 4:
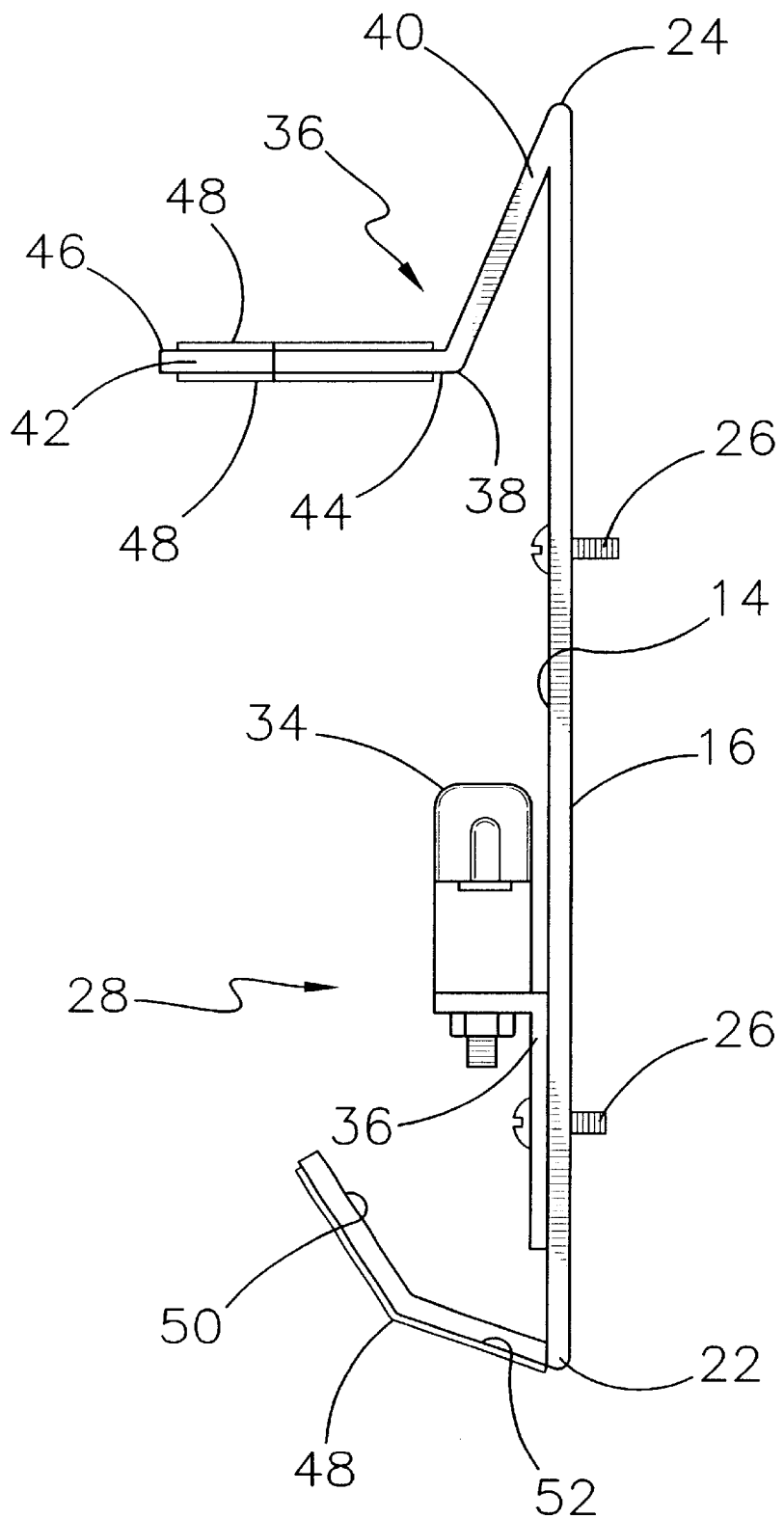
FIG. 4 is a schematic side view of the present invention.
Figure 5:
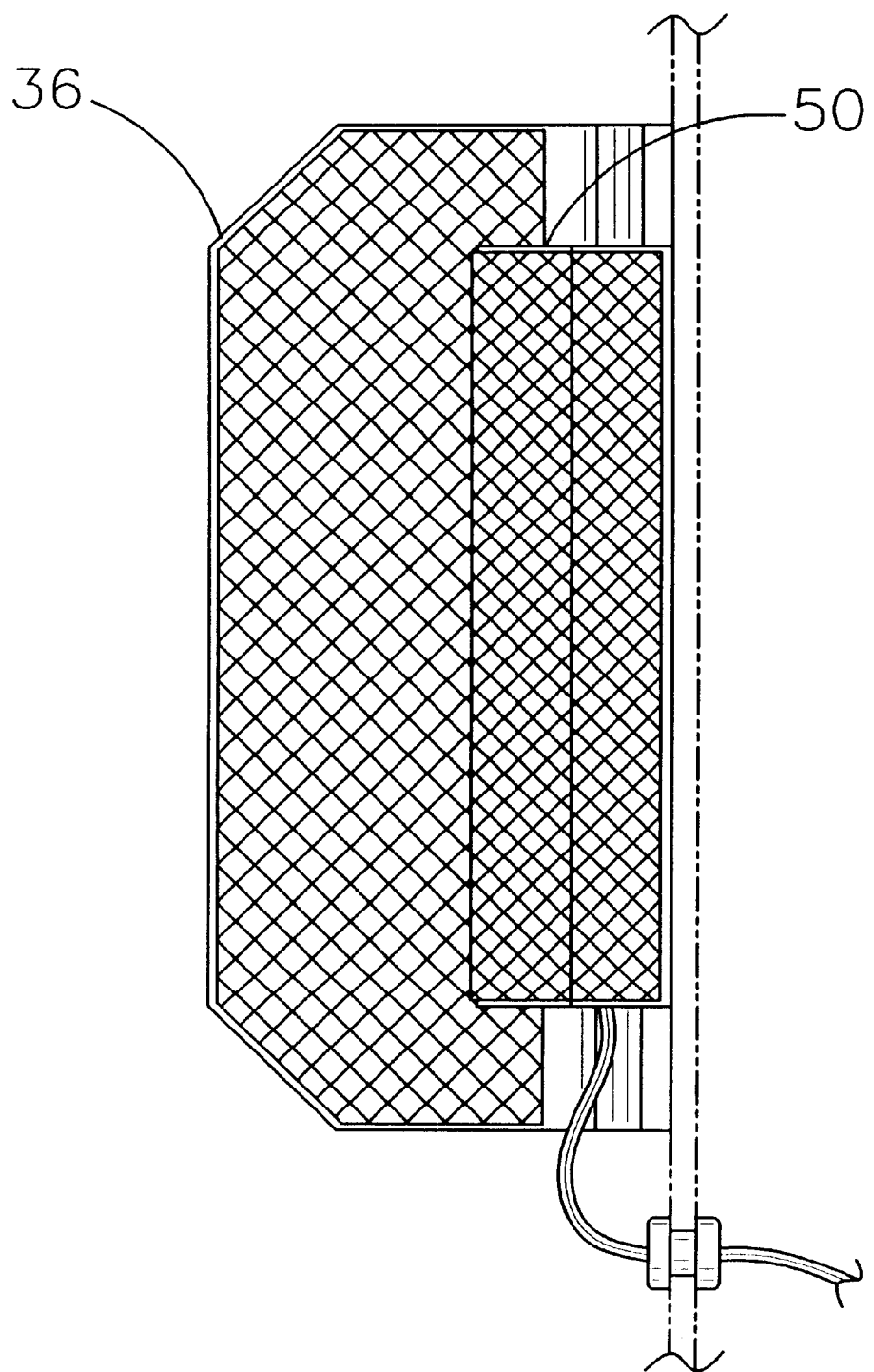
FIG. 5 is a schematic front view of the present invention.
Figure 6:
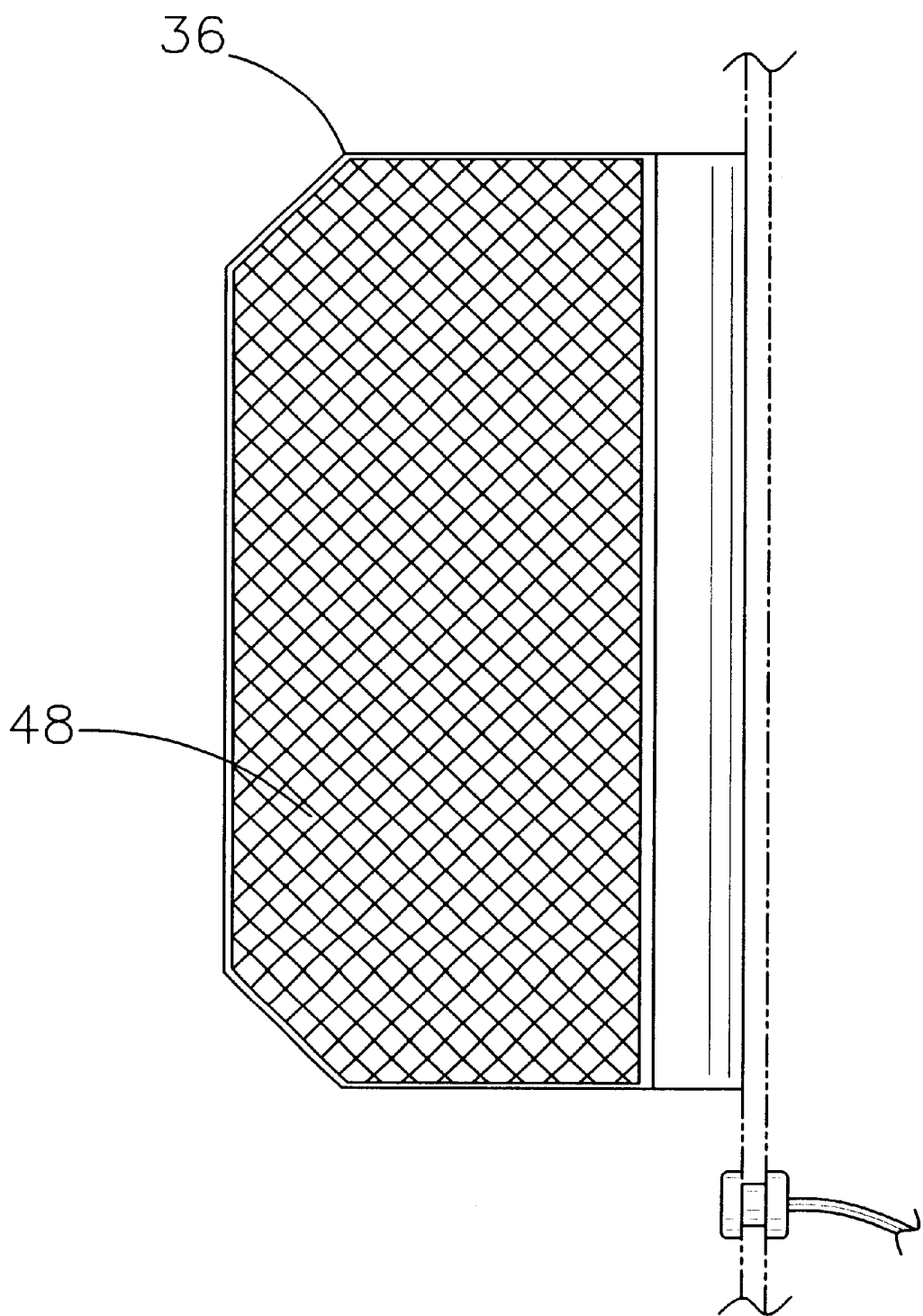
FIG. 6 is a schematic back view of the present invention.

With reference now to the drawings, and in particular to FIGS. 1 through 6 thereof, a new reference light for maneuvering a vehicle embodying the principles and concepts of the present invention and generally designated by the reference numeral 10 will be described.

As best illustrated in FIGS. 1 through 6, the reference light for maneuvering a vehicle 10 generally comprises a device positionable on a vertical side wall 72 of an elongated vehicle 70, such as a recreational vehicle. The device 10 is disposed above a back tire 74 of the elongated vehicle 70. Ideally, two devices 10 are used, one on each side of the vehicle 70. The device 10 gives a driver of the vehicle 10 a reference point for such actions as passing vehicles or parking.

The device includes a plate 12 having a first surface 14 and a second surface 16. The plate 12 has a top edge 18, a bottom edge 20, a first side edge 22 and a second side edge 24. A plurality of fasteners 26 is extended through the first 14 and second 16 surfaces for removably attaching the plate 12 to the vehicle 70 such that the first side edge 22 extends toward a front side 76 of the vehicle 70. The fasteners 26 comprising conventional mechanical fasteners such as bolts, though the device 10 may be mounted on the vehicle 70 during the construction of the vehicle with brackets.

A light emitting device 28 is securely attached to the first surface 14 and directed toward the second side edge 24 of the plate 12. The light emitting device 28 is operationally coupled to an electrical power supply 30 of the vehicle. The light emitting device 28 includes a plurality of light bulbs 32 positioned in a generally transparent casing 34. The casing 34 is attached to a bracket 36 which is securely attached to the first surface 14.

A panel 36 is attached to the second side edge 24 of the plate 12. The panel 36 has a bend 38 therein extending along the panel 36 and orientated generally parallel to the second side edge 24 of plate 12 such that the panel 36 has a first portion 40 and a second portion 42. The first portion 40 is adjacent to the plate 12 and extends generally toward the light emitting device 28. The second portion 42 extends away from the plate 12 and is positioned in a plane orientated generally perpendicular to a plane of the first surface 14 of the plate 12. The panel 12 has a first side 44 facing the light 28 and a second side 46 positioned opposite of the light 28. A light reflective covering 48 is attached to and generally covers the second portion 42 of the first 44 and second 46 sides.

A guard member 50 is attached to the first side edge 22 and is angled toward the light emitting device 28. The panel 36 extends further away from the first surface 14 than the guard member 50. The guard member 50 has an outer surface 52 facing away from the light emitting device 28. A light reflective covering 48 is attached to and generally covers the outer surface 52 of the guard member 50. Ideally, the plate 12 has tapered edges 54 tapering toward the guard member 50. The guard member 50 protects the light emitting device 28 and also acts as a bug deflector.

In use, the device 10 is preferably coupled to the light system of the vehicle 70 such that the device 10 is illuminated when the light system is turned on. The driver uses the device as a point of reference when maneuvering at night.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminated reference point device for positioning on a vertical side wall of an elongated vehicle, said device being disposed above a back tire of said elongated vehicle, said device comprises:

a plate having a first surface and a second surface, said plate having a top edge, a bottom edge, a first side edge and a second side edge, a plurality of fasteners being extended through said first and second surfaces for removably attaching said plate to said vehicle such that said first side edge extends toward a front side of said vehicle;

a light emitting device being securely attached to said first surface; and a panel being attached to said second side edge of said plate, said panel having a first side facing said light and a second side positioned opposite of said light, a light reflecting material being attached to said first side of said panel, said light being directed toward said panel.

2. The illuminated reference point device as in claim 1, wherein said panel has a bend therein extending along said panel and orientated generally parallel to said second side edge of plate such that said panel has a first portion and a second portion, wherein said first portion is adjacent to said plate, said first portion extending generally toward said light emitting device, said second portion extending away from said plate and being positioned in a plane orientated generally perpendicular to a plane of said first surface of said plate.

3. The illuminated reference point device as in claim 1, further including a guard member being attached to said first side edge and being angled toward said light emitting device, wherein said panel extends further away from said first surface than said guard member.

4. The illuminated reference point device as in claim 3, wherein said guard member has an outer surface facing away from said light emitting device, a light reflective covering being attached to and generally covering said outer surface of said guard member.

5. The illuminated reference point device as in claim 1, further including a guard member being attached to said first side edge and being angled toward said light emitting device, wherein a panel extends further away from said first surface than said guard member.

6. The illuminated reference point device as in claim 5, wherein said guard member has an outer surface facing away from said light emitting device, a light reflective covering being attached to and generally covering said outer surface of said guard member.

7. The illuminated reference point device as in claim 1, wherein said light emitting device is operationally coupled to an electrical power supply of said vehicle.

8. The illuminated reference point device as in claim 1, wherein said light emitting device includes a plurality of light bulbs positioned in a generally transparent casing, said casing being attached to a bracket, said bracket being securely attached to said first surface.

9. An illuminated reference point device for positioning on a vertical side wall of an elongated vehicle, said device being disposed above a back tire of said elongated vehicle, said device comprises:

a plate having a first surface and a second surface, said plate having a top edge, a bottom edge, a first side edge and a second side edge, a plurality of fasteners being extended through said first and second surfaces for removably attaching said plate to said vehicle such that said first side edge extends toward a front side of said vehicle;

a light emitting device being securely attached to said first surface and directed toward said second side edge of said plate, said light emitting device being operationally coupled to an electrical power supply of said vehicle, said light emitting device including a plurality of light bulbs positioned in a generally transparent casing, said casing being attached to a bracket, said bracket being securely attached to said first surface;

a panel being attached to said second side edge of said plate, said panel having a bend therein extending along said panel and orientated generally parallel to said second side edge of plate such that said panel has a first portion and a second portion, wherein said first portion is adjacent to said plate, said first portion extending generally toward said light emitting device, said second portion extending away from said plate and being positioned in a plane orientated generally perpendicular to a plane of said first surface of said plate, said panel having a first side facing said light and a second side positioned opposite of said light, a light reflective covering being attached to and generally covering said second portion of said first and second sides; and a guard member being attached to said first side edge and being angled toward said light emitting device, wherein said panel extends further away from said first surface than said guard member, said guard member having an outer surface facing away from said light emitting device, a light reflective covering being attached to and generally covering said outer surface of said guard member.

* * * * *